US011194867B2

(12) United States Patent
Balz

(10) Patent No.: US 11,194,867 B2
(45) Date of Patent: Dec. 7, 2021

(54) SYSTEM, METHOD AND APPARATUS FOR DYNAMICALLY IDENTIFYING POP-OUT LINKS IN NETWORKED APPLICATIONS VIA LOOKUP

(71) Applicant: Christopher Mark Balz, Palo Alto, CA (US)

(72) Inventor: Christopher Mark Balz, Palo Alto, CA (US)

( * ) Notice: Subject to any disclaimer, the term of this patent is extended or adjusted under 35 U.S.C. 154(b) by 120 days.

(21) Appl. No.: 15/678,105

(22) Filed: Aug. 15, 2017

(65) Prior Publication Data

US 2018/0052930 A1    Feb. 22, 2018

Related U.S. Application Data

(60) Provisional application No. 62/375,878, filed on Aug. 16, 2016.

(51) Int. Cl.
| | |
|---|---|
| *G06F 16/951* | (2019.01) |
| *H04L 29/08* | (2006.01) |
| *G06F 16/954* | (2019.01) |
| *G06F 16/955* | (2019.01) |

(52) U.S. Cl.
CPC .......... *G06F 16/951* (2019.01); *G06F 16/954* (2019.01); *G06F 16/9558* (2019.01); *H04L 67/025* (2013.01)

(58) Field of Classification Search
USPC .......................................... 706/47; 707/709
See application file for complete search history.

(56) References Cited

U.S. PATENT DOCUMENTS

| | | | |
|---|---|---|---|
| 10,904,328 B2 * | 1/2021 | Balz ..................... | H04L 67/1095 |
| 2008/0005127 A1 * | 1/2008 | Schneider ......... | H04L 29/12594 |
| 2010/0070448 A1 * | 3/2010 | Omoigui ............. | H01L 27/1463 |
| | | | 706/47 |
| 2014/0258262 A1 * | 9/2014 | Balz ..................... | G06F 3/0481 |
| | | | 707/709 |

* cited by examiner

*Primary Examiner* — Hung T Vy
(74) *Attorney, Agent, or Firm* — Bryan Fibel

(57) ABSTRACT

System, method, and apparatus for providing and using a centralized Link Metadata System to identify if navigational links are pop-out links, is provided. The present invention offers a Link Metadata System, available on the Internet, of metadata associated with any given, specific Internet domain and URL or URI path combination. Software browsing user agents on remote window servers are then configured with the ability to request metadata from the Link Metadata System indicating that a link is a pop-out link. Upon receiving metadata, the user agent determines whether to perform navigation as normal or perform the pop-out link functionality of reloading the remote client web browser's top level container with the content provided at the link's destination URL or URI.

11 Claims, 4 Drawing Sheets

SYSTEM, METHOD AND APPARATUS FOR DYNAMICALLY IDENTIFYING POP-OUT LINKS IN NETWORKED APPLICATIONS VIA LOOKUP

CROSS REFERENCE TO RELATED APPLICATIONS

This application claims priority from a provisional U.S. patent application No. 62/375,878 filed on Aug. 16, 2016.

FIELD OF THE INVENTION

Embodiments of the invention generally relate to navigational links on the World Wide Web. Embodiments of the invention specifically relate to looking up link metadata from a centralized system and utilizing the metadata to identify links to remote windows, such as remote desktops and remote application windows.

BACKGROUND

Hyperlinks ("links") that are based on a domain name, such as example.com, are looked up by user agents (such as Web browsers) in order to find the Internet Protocol ("IP") address where they are located. This action, which is enabled by the Domain Name System ("DNS"), necessarily happens by definition before the desired resource can be accessed. Thus, this lookup of the location of a domain name is critical to the functioning of the World Wide Web. However, as the Web has grown in importance and in the variety of its use-case scenarios, so has the need for providing metadata, in addition to essential i.p. address information.

Computer software can be used via a remote application window, remote desktop window, or remote graphical windowing user session windows (collectively referred to as "remote windows" hereinafter). This includes software on mobile devices as well.

Performing navigational action on links within a remote window to resources that are served themselves as remote windows traditionally results in successively nested remote windows. Tasking the server providing the origin remote window with the display of the destination remote window represents excess overhead since the destination remote window is perfectly capable of displaying itself directly to the remote client, without all the intervening overhead.

Links can be specially marked, or annotated, so as to be recognizable by the remote machine as pop-out links. When navigational action occurs on a link marked as a pop-out link, the nesting problem is then avoided by refreshing the session with the content at what would have been the inner window, so that it is now the outermost window. However, in this scenario each instance of the link must be individually marked as a pop-out link in order to achieve this. Also if instances of a link were not marked as pop-out links, but the content at the link came to be served as a remote window, each instance of the link would need to be changed to reflect this.

SUMMARY

System, method, and apparatus are described for providing and using a centralized Link Metadata System to identify if navigational links are pop-out links. The present invention offers a Link Metadata System, available on the Internet, of information associated with any given, specific Internet domain and URL or URI path combination. Software browsing user agents on remote window servers are then configured with the ability to request metadata from the Link Metadata System, indicating that a link is a pop-out link. Upon receiving metadata, the user agent determines whether to perform navigation as normal or perform the pop-out link functionality of reloading the remote client web browser's top level container with the content provided at the link's destination URL or URI.

The invention provides for, upon navigational action by a user on a link on a client web browser that is browsing a remote graphical computer desktop, remote graphical application window, or remote graphical windowing user session, sending a request for information to a lookup server, looking up information, using the link, in a lookup server, receiving, from the lookup server, a response with a payload indicating that the link is a pop-out link, and sending a directive to the client web browser to reload the client web browser's top level container with content provided at the pop-out link's destination URL or URI. The user on the client web browser can include a human user or a search engine web crawler. The request for information can be an http get request. The lookup server can reside on the same physical or virtual computer as a DNS server. The lookup server can be integrated programmatically into a DNS server, or vice-versa.

A Link Metadata server apparatus comprises at least one processor, a registry of link addresses, each link address associated with a set of metadata, wherein a request from a client for link metadata is looked up in the registry, said metadata indicating that the link is a pop-out link. The apparatus can further comprise a means for sending the looked-up link metadata to the client. Additionally, a DNS server can be included resident on the apparatus. Further a DNS server can be integrated programmatically on the apparatus. The request from a client can be an http get request.

DETAILED DESCRIPTION

Reference will now be made in detail to the present embodiments discussed herein, illustrated in the accompanying drawings. The embodiments are described below to explain the disclosed system, method, and apparatus by referring to the Figures using like numerals. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

The subject matter is presented in the general context of systems and program modules. Those skilled in the art will recognize that other implementations may be performed that may include different data structures, components, or routines that perform similar tasks. The invention can be practiced using various computer system configurations, such as client server systems.

System, method, and apparatus for providing and using a Link Metadata System to identify if navigational links are pop-out links, is provided. The present invention offers a Link Metadata System ("LMS"), available on the Internet, of information associated with any given, specific Internet domain and URL or URI path combination (the "link"), referred to below as "link metadata". Software browsing user agents are then configured with the ability to request metadata from the LMS. Upon receiving metadata from the LMS, the user agent determines whether to perform navigation as normal or perform the pop-out link functionality of reloading the remote client web browser's top level container with the content provided at the link's destination URL or URI.

Figure 1:
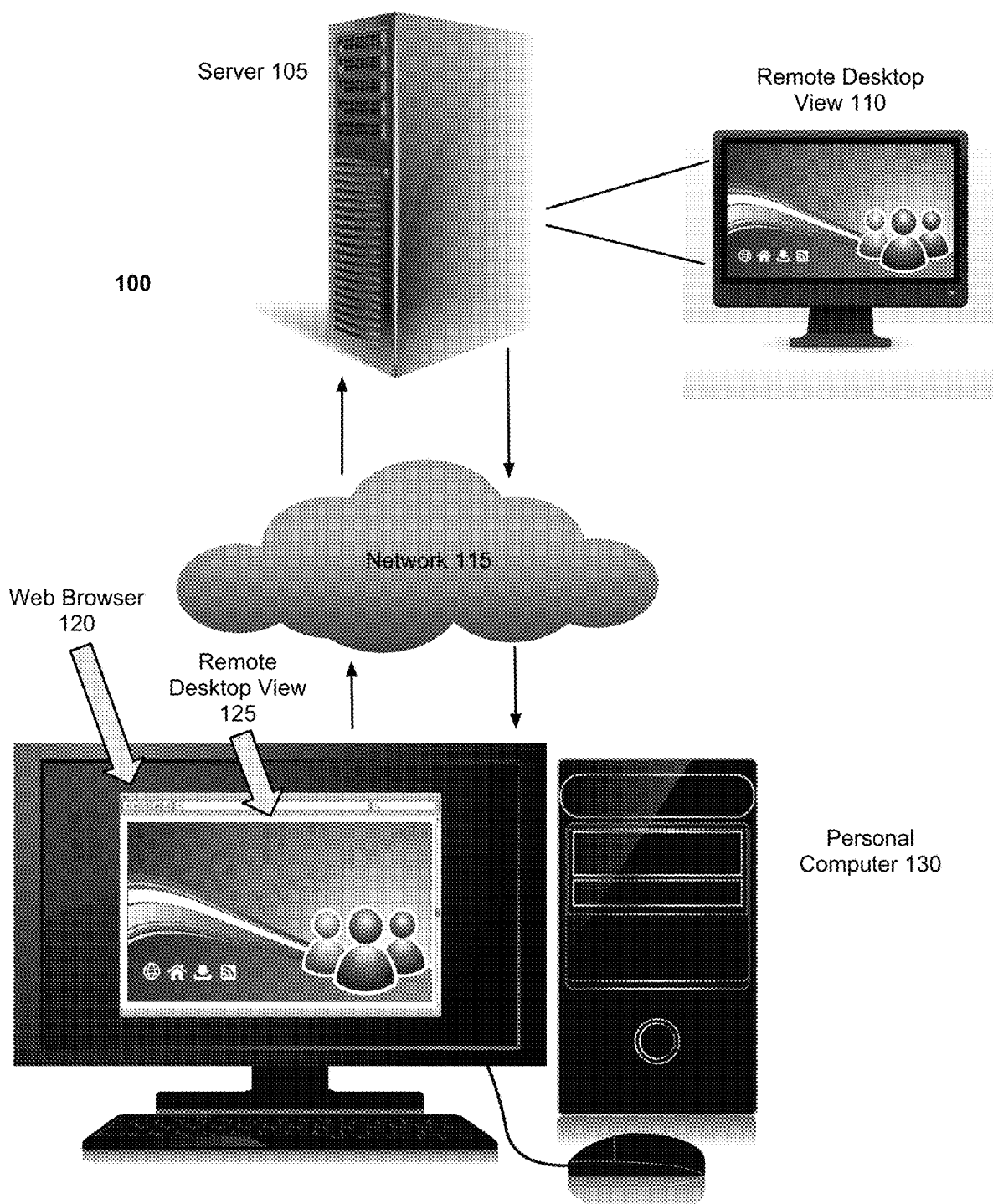
FIG. 1 is a block diagram depicting a remote window server, accessible through a network, and providing a view of its graphical desktop to a remote client personal computer on a web browser running on the personal computer.

FIG. 1 is a block diagram 100 depicting a typical client server system 100 where the invention would be used. It consists of a remote window server 105 ("Server 105"), accessible through a network 115 such as the Internet or a local-TCP/IP-based network. Server 105 provides a view of its graphical desktop (seen for example on a monitor plugged into it, as in Desktop View 110), although this can equally be a single application window such as would commonly run upon a graphical computer desktop, or in the most general case, a non-application graphical window, such as a Display Manager program that is not, strictly defined, an application, but presents a graphical window to the user for the purpose of logging into the graphical desktop, upon which run applications. The latter represents an example of what is known in the art as a "graphical windowing user session". The client, Personal Computer 130, accesses this Desktop View 110 via Web Browser 120, which shows Remote Desktop View 125. Remote Desktop View 125 shows the exact same content as Desktop View 110 (although it also could vary, depending on the exact configurations made on Server 105), but runs on the client computer (Personal Computer 130), and not on Server 105. The user may interact with the application using the mouse and keyboard shown and/or any other input device. Additional usable client devices 130 include, but are not limited to, smartphones, tablets, connected entertainment devices (such as smart TV's), digital media players, wearable devices/implants (computing devices integrated with the human body but capable of displaying desktops, application windows, or other graphical windows from remote computers so that the wearer or host individual can interact with the display). Such computer devices may include one or more processors, data storage in the form of memory (solid-state storage, hard disk, random access memory, cache memory, etc.), an operating system ("OS"), and network connectivity with browsing capability.

Computer software can be used via a remote window and during the course of that use, performing navigational action on links within a remote window to resources that are served themselves as remote windows can result in successively nested remote windows. Link navigational actions can be significantly optimized to avoid this excess nesting of windows problem. In order to avoid the excess nesting of windows problem, navigational links to remote windows must be handled specially. Also, search engines benefit from a different kind of special handling of these navigational links.

Links can be specially marked so as to be recognizable by the remote machine as pop-out links. The software (the computer operating system and/or the userland applications running thereupon) can be modified so that when navigational action occurs on a link marked as a pop-out link, it does not follow pop-out navigational links in the traditional manner, thereby avoiding the excess nesting problem. Instead, the software forwards the navigational link to the viewer used by the user as the display for the remote application window, so that the viewer or a child thereof can be entirely redirected to the resource at the navigational link, thus avoiding the excess nesting problem.

Search engines benefit from avoiding the excess nesting problem because, where excess nesting is avoided, their search agents (also known as "web crawlers" or "search bots") do not have to wait for the excess content rendering operations to complete. This way, the search bots can examine more content in less time. Additionally, search engines benefit from dynamic pop-out link identification from the side function of the return of link metadata, of which the pop-out nature is just one possible element: Such metadata can contain, for example, the coordinates of links on a remote window. This greatly facilitates the search bot's traversal of the web of links, because it does not have to apply pattern recognition to recognize links or semantically search on the page for links. Rather, the coordinates of the links on the "bitmap" of the remote window are listed at a document referenced by the metadata, and the search bot can click them immediately.

Figure 2:
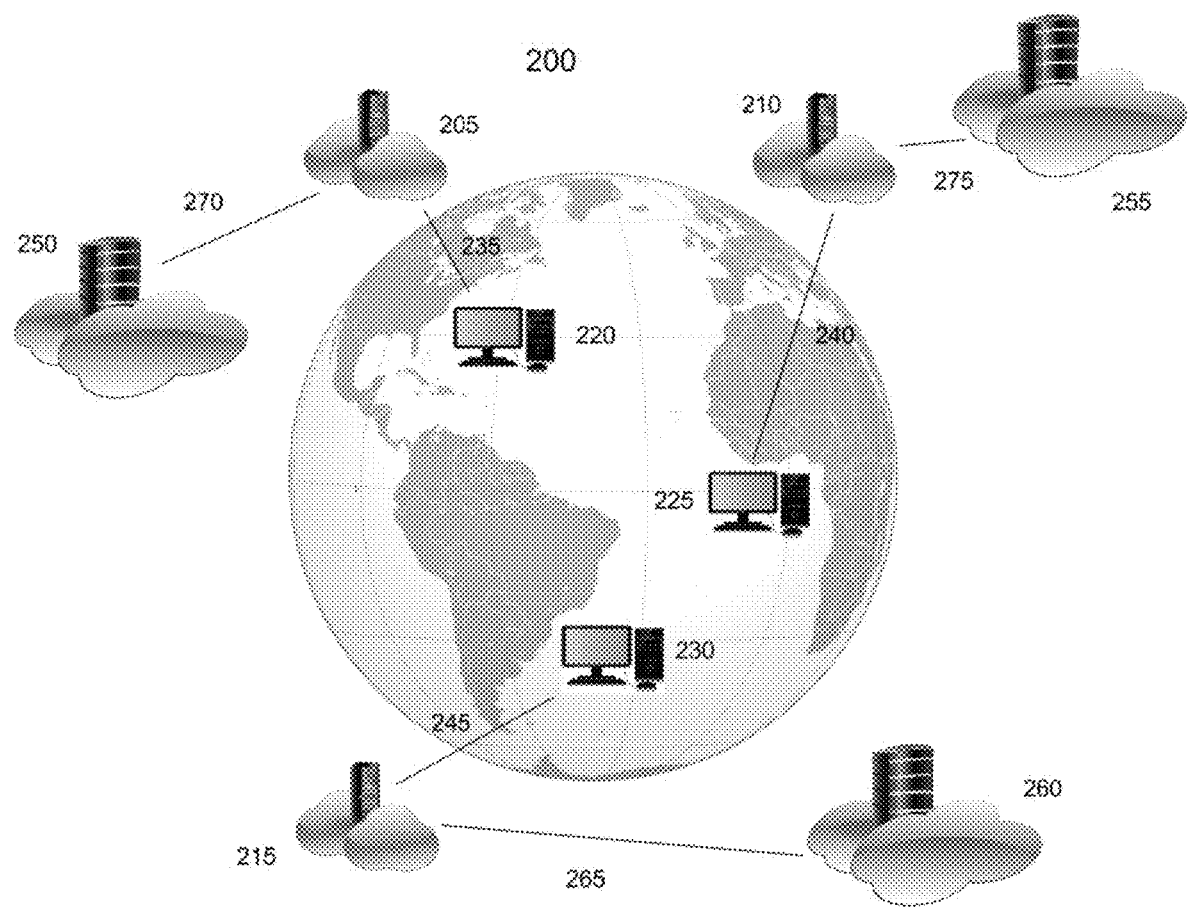
FIG. 2 is a block diagram depicting a plurality of remote window servers tuned for delivery of Link Metadata System lookup results and remote client personal computers accessing that service.

FIG. 2 is a block diagram 200 showing client computer devices/apparatuses 205, 210, 215 ("computers") configured to access the LMS by communicating with the geographically closest server device/apparatus 250, 255, 260 for the LMS. Note that in this diagram, the remote window servers 205, 210, 215 are clients of the LMS servers 250, 255, 260. The remote window servers provide the remote windows to end-user computers 220, 225, 230. In practice, the fastest access may be obtained in some scenarios by accessing a server that is not geographically closest. However, where this is the case, the geographic difference in distance will not be great, unless there is a rare, major outage or service impediment at the geographically closer server or servers. The communication 235, 240, 245 between the end-user computers 220, 225, 230 and the client computers 205, 210, 215 as well as the communication 265, 270, 275 between the client computers 205, 210, 215 and the LMS servers 250, 255, 260 is done via an IP protocol such as TCP, UDP, or HTTP. The information communicated may include whether the link is a pop-out link, and/or other link metadata.

The end-user computers 220, 225, 230 include, but are not limited to, personal computers, laptops, smartphones, tablets, connected entertainment devices (such as smart TV's), wearable devices/implants (computing devices integrated with the human body but capable of displaying desktops or application windows), and data center computers upon which search bots run. The remote window servers/client computers to the LMS servers 205, 210, 215 include, but are not limited to, personal computers, laptops, smartphones, tablets, connected entertainment devices (such as smart TV's), and data center computers upon which search bots run. Some components of the computers include a CPU, memory (hard disk or solid-state nonvolatile storage, random access memory cache memory, etc.), an OS, and network connectivity.

The LMS can contain similar computer components, such as a CPU, memory (hard disk or solid-state nonvolatile storage, random access memory cache memory, etc.), an OS, and network connectivity. It contains a registry of URLs and URIs (URLs and URIs hereinafter referred to collectively as "link addresses"), each associated with a set of metadata about those links. In order for the LMS to contain the metadata described above, the metadata must first be registered with the LMS. For this purpose, the LMS supports one or more software applications (such as a web application, mobile application, desktop application, or command-line application) that takes authenticated submissions of this metadata in the same general manner as currently done by the Domain Name System ("DNS") used on the Internet and known to those skilled in the art. The LMS is optimized in a manner similar to DNS so that LMS servers would both be located close to end users and any intermediaries such as proxies (collectively referred to as "clients of the LMS"), and would exist in sufficient quantity in various locales, so that clients of the LMS would receive a fast response from the LMS to their queries. Individual LMS servers can be located geographically and exist in numbers, distributed around the Earth, sufficient to provide response time comparable to that offered by the DNS system. LMS lookup is distinct from the DNS lookup because it utilizes the entire link, whereas DNS utilizes only the hostname, and also because the LMS returns link metadata, instead of a translation of a hostname to an Internet Protocol address.

Specifically, the LMS should support fast lookup of complex information, which is why a hash-table-based LMS in fast-access memory such as random-access memory ("RAM"), is a preferred implementation. When new metadata enters the LMS, re-hashing may need to occur occasionally in order to avoid hash table key collisions. This will introduce update latency (delay from the time of submission by a user, including a search bot, of new data to the LMS, to the time that the new metadata is served to clients of the LMS), notification of which will need to be provided, as is done presently in the management of the DNS, to entities registering new metadata with the LMS, so that they can plan their verification of updates accordingly. Other embodiments may use other data structures for the LMS.

The lookup functionality of the present embodiment is distinct from current HTTP-based redirect functionality, such as the HTTP status code of 302 or the similar 303 and 307, and the associated header field payload of the alternative link. (Following references will be made only to 302, but the same reasoning holds for 303 and 307). This is for several reasons, one of which is that the 302 response has no specific field for information about the nature of the content at the link, such as if it is served as a remote application window or remote desktop. Also, the 302 response provides no options that the client may choose from beyond the single redirect link. Finally, the LMS provides superior performance to the 302-based mechanism for retrieving navigational metadata important to the client, because retrieving a 302 may require (for example in the case of reaching an online software application, such as an e-mail program) triggering the entire application server for the resource, whereas retrieving the metadata from the LMS involves using a network and associated servers optimized, as is for example the existing DNS, for providing the specific metadata. The avoids the computational overhead associated with application security; user agent session; load balancing for the application; the use of a software platform optimized for portability across operating systems and computer languages; ease of software creation and maintenance instead of speed of execution (as is typical upon application servers, which often run the Java Virtual Machine, Java and/or JavaScript); and the many Internet network hops that would usually be required to reach an application server.

Finally, for efficiency purposes, due to the large use of volatile computer memory, such as RAM and its variants, the lookup registry should only include the minimum technical information necessary for the proper display of the requested resources.

In other implementations, DNS itself can be extended to provide access to the LMS, or alternatively the LMS can bundle in any necessary query to DNS and return the result of that query as well. If implemented as an extension of DNS, optimized queries to DNS can omit any request for LMS services where the querying agent was certain that they would not be needed. Additionally, in either of the implementations with DNS, the querying agent would only need to make one request instead of two if either DNS or the LMS could handle both needs for the additional information by forwarding the request for additional information on to the other respective service.

For example, a LMS server can be resident locally on the same physical or virtual computer that a DNS server is located on. The LMS can also be integrated programmatically into a DNS server itself, so that both shared the same operating system application process. In scenarios where a DNS lookup request must be made (which is most of them), this would eliminate almost all of the network (Internet or otherwise) latency present from the end user (including search bots) to the LMS, which is generally speaking the majority of the latency. In the scenario where DNS would "wrap" the lookup functionality, the DNS system would, in the scenario where the link contains an I.P. address instead of a domain name, not operate itself on the request, but would merely forward it onward to the LMS, and then return the response to the client. In the scenario where the DNS wraps the lookup functionality, a given LMS lookup operation can be accomplished as a sub-operation of the DNS lookup upon the domain name or I.P. address supplied in the link, where the LMS lookup is initiated from or on the DNS server machine itself—or vice-versa, where the LMS lookup additionally performs any DNS lookup, the DNS lookup being initiated from the lookup server machine.

Since the lookup servers will almost always be located much closer (in terms of Internet router hops away) on the Internet network to the DNS servers than the client, significant latency could be avoided by combining the services as described above. In the rare scenarios where the lookup were to be presented, in a given query, with a link that already had the numeric I.P. address coded into it, in place of the text-based domain name, this DNS query would not need to be made.

Figure 3:
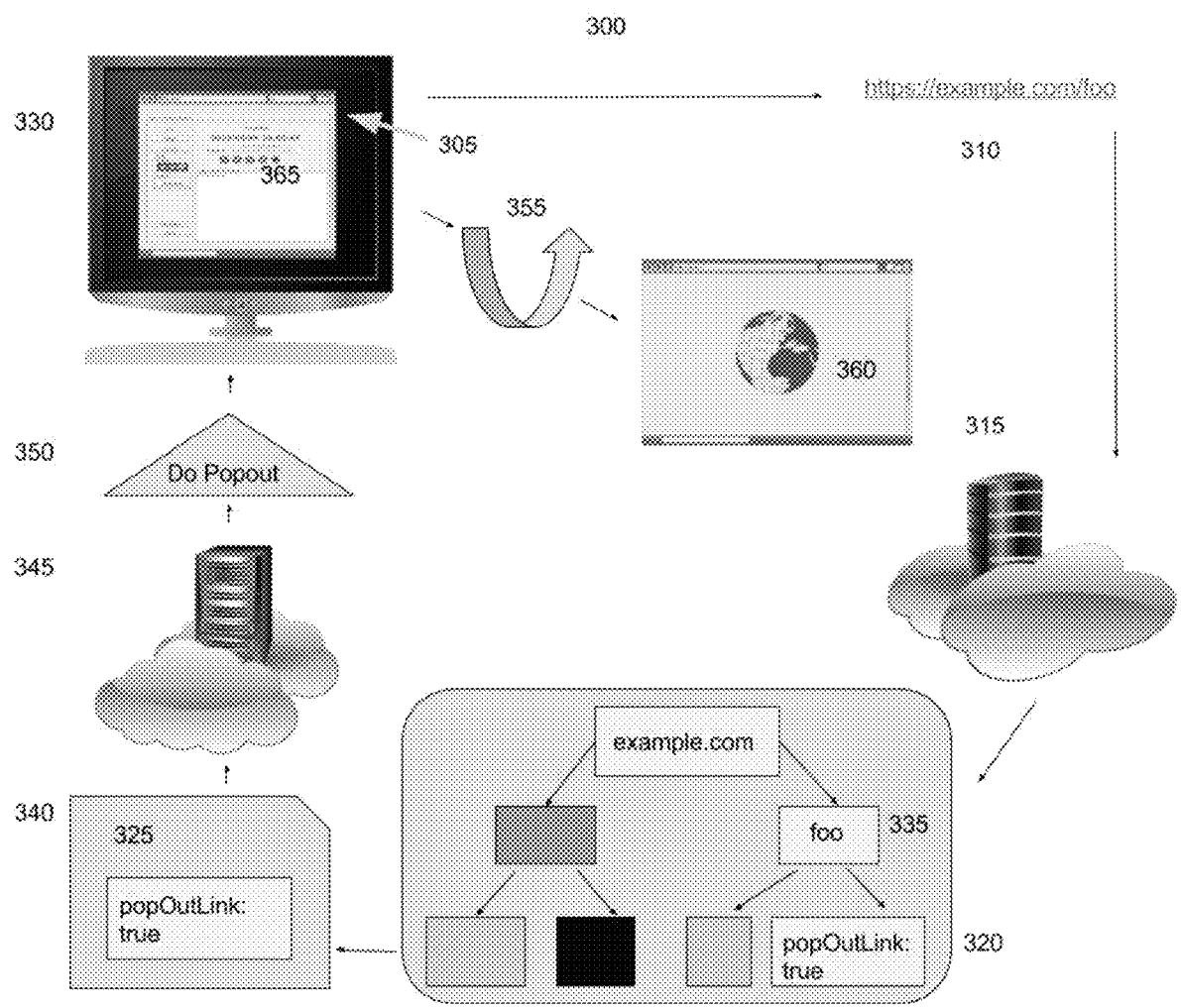
FIG. 3 is a flowchart depicting a general use-case scenario where a user initiates navigation of a link, and then that link is looked up in the Link Metadata System, allowing the user agent to find out if the link is a pop-out link.

FIG. 3 is a flowchart 300 depicting a general use-case scenario where a user initiates navigation of a link from a software application 365 running on a remote computer, and served as a remote application window on the user's local web browser 305. For example, often users of word processing software applications will click on links in the documents that they are reading in the word processor, in order to view the content at that link. The user noted in the above description of FIG. 3 could also be a search bot, instead of a human user. In that scenario, the search bot will benefit from speedier delivery of the content, due to the avoidance of the excess of the nesting of remote windows.

Additionally, the search bot may supply a parameter, such as "robots: true" in its query to the LMS, and receive back supplementary materials to aid in its parsing of the content. For example, the LMS record for the resource may contain the URL(s) or URI(s) to documents summarizing the content in plain text. Or, in the case where the content were presented as a bitmap, the resource may contain the link addresses to structured documents describing the coordinate location of key elements (such as further hyperlinks) in the bitmap that represents the resource. In the bitmap case where the sought-after elements were hyperlinks, this would enable the search bot to quickly "spider" or visit those hyperlinks since it would reduce greatly the use of computational resource required search through the bitmap for such links. Similarly, also in the bitmap case, the coordinates of text blocks and images could also be supplied, enabling the search bot to snapshot the images and quickly load blocks of text for processing.

The remote software application 365, which is running on a remote window server that provides the remote application window 365 that the user is using but that is displayed on the end user's machine 330 via the end user's local web browser 305 (the "user agent"), receives the user's command to navigate the link 310. The remote software application 365 next creates its query for the LMS server 315 that is resident on a server computer apparatus. In this example, the query is transported via HTTP, but other network transport protocols could be used as well. The request, containing the whole link, is sent to the LMS server 315 using the web browsing standard machinery for dispatching an HTTP request, as described below.

The following parts of the link address and their respective values are isolated ("the isolation") at the server, based on the incoming link address. To reduce the potential for implementation errors on the various types of clients for the straightforward and non-computationally-intensive link address parsing task, the isolation is done on the server in the preferred embodiment. Where the query term isolation occurs on the server, the link itself is composed on the client into a standard http 'get' query, and HTTP-encoded so that it can function properly as such. The parts of the link address can include the scheme (for example, http, https, ftp), the domain (or subdomain) name or literal numeric IP address, the port number, and the path (such as "an/example" in "http://example.com/an/example"). The values extracted from the link address are referred to as the "query terms".

In other embodiments, the isolation of the query terms could occur on the client. In this embodiment, the LMS would accept an HTTP protocol-based query, such as an HTTP 'get' query, with the individual query terms discussed above provided separately in the form of key-value pairs, instead of being sent together as a single query term in the form of an HTTP-encoded link address. Thus, the content of the query would instead be, for example: "scheme=https&domain=example.com&path=foo." Or, alternatively in a data-transfer minimizing protocol for the LMS, the content of query would instead be, for example: "sc=https&dn=example.com&ph=foo." When the LMS server 315 receives the query, it proceeds as normally, except that it does not need to isolate the query terms. Notably, the use of the http 'get' method offers the benefit of http standard cache control, so that unnecessary lookups of the query can be avoided, lessening load on all systems.

In either embodiment, query term isolation on the client or on the server, the client's query may optionally contain an indication that the client would like to receive a certain kind of information about the resource at the link address, such as the content type, optionally in addition to whether or not the link is a pop-out link. Optimally, the LMS will conform to standards of art such as the MIME Internet standard, so that a query for content type can be specified as "Content-Type" and the response will be a valid MIME content type such as "video/mp4". Any abbreviation of "Content-Type" for the purposes of efficiency would map to "Content-Type".

When the LMS receives the query, it consults its registry in order to find the requested metadata, using the query terms. The registry can exist in a computer readable medium on the server, such as fast random-access memory. The registry takes as its query parameters, at a minimum but not limited to, a given fully-qualified link address and the type of metadata requested. The query parameters are grouped into two groups, the link address part and the metadata type requested part, but the total number of groups is not limited to only two. The type of metadata is specified similarly to the specification for a link address: Any parameter supplied to the query must conform to this specification. For example, for efficient Internet traffic (less data to transmit), the characters "po" will stand for "popOutLink".

In a preferred embodiment, the LMS then looks up that link by using a data structure 320 and a permissive lookup approach that is based on successive lookup in hash tables. The permissive lookup approach is a configuration that enables the LMS responses to supply a default result set in the case where the client does not specify exactly what metadata is requested of the LMS. In this permissive lookup approach, if the scheme is omitted, http is used, and if that fails, https is used. If no entries for "http" or "https" exist in the registry for the given link address, then that selector (scheme) is not used. If the port is omitted, the default port for the scheme is used, such as 80 for http and 8080 for https. And similarly, if no entries for the port number exist in the registry entry for the given link address, then the port number selector is not used. The same approach is used for any other selectors other than the top-level Internet domain name selector. The top-level Internet domain name selector selects for values such as "example.com".

An example of the data structure 320 represented in JavaScript Object Literal Notation ("JSON") format follows:

```
{
    "example.com": {
        "foo": {
            "popOutLink": true
        }
    }
}
```

Note that in the example code given above, many other keys in addition to "foo" could exist (such as "bar", or any other key name than "foo"). These would hold data for different object path combinations such as link address paths or HTTP port number.

The lookup operates by first finding the domain name, such as 'example.com' in a data structure 320, which, in the preferred embodiment, is a true hash-table of domain names (such as the parent object of 'example.com') that will provide a large reduction in lookup space for the next lookup. Then the lookup finds each term of the path, such as 'foo,' in the data structure 320, in order as a successive set of nested true hash-tables, and finally checks for any specific scheme or port assignment. Any specific scheme and port would be represented, nested successively, as a descendent property of 'foo.'

The LMS 315 responds with a part 325 of the tree of hash tables data structure 320, although no restriction to a tree data structure or to hash tables is implied here. The payload, in one implementation, would be a JSON data structure. The LMS responds to the http 'get' request with a payload including the Returned Item 325, which is an informational response to the specific type of metadata requested, which is whether the link is a pop-out link or not. Returned Item 325 is the value of the last available lookup property 335 in the data structure 320, 'foo', because the lookup picks the value of the last available lookup property. Recall that 'foo' is the path element of the URL. Example code of Returned Item 325 follows:

```
{
   "popOutLink": true
}
```

Notice that the above code is the same as the value of "foo" in the previous code example.

The user agent receives the returned item 325 and, depending upon the client type, performs actions dependent upon the information contained in the payload 340. The 'popOutLink' element contained in the Returned Item 325 of the response payload 340 is processed by the software application 365. As depicted, the software application 365 is a software application that can handle hyperlinks, such for example a word processing program as used on a conventional desktop computer but not limited to the same. This software application 365 is running upon a server 345 that presents software application 365 as a remote window on the web browser 305 that is running on end-user computer 330. Upon determining from the Returned Item 325 that the link 310 is a pop-out link, a directive 350 is sent to the remote client web browser 305 to reload 355 the top-level container in web browser 305 that is currently displaying the content presented by the remote computer (the remote window that is software application 365, displayed by web browser 305) with the new content 360 that the link 310, displayed to the end-user within the remote window, points to. This avoids the excess overhead of the nesting of remote windows, because now the remote client web browser 305 is showing the content at the pop-out link directly, instead of viewing it as passed through the remote window server that displays software application 365. The local client can be embodied in client software that generally or strictly conforms to the specifications of a web application as defined by the World Wide Web Consortium, that runs on the end user's local computer on a standard web browser or on a web-enabled application, and that is able to execute by using only building blocks made from technologies defined by the World Wide Web Consortium. If the link opens so that the current content of the web browser window, web browser tab, or HTML frame (including an iframe) of the web browser 305 where the link is present is replaced by the new content, then the web browser can show the new content in the top-level container of the web browser window, web browser tab, or HTML frame (including an iframe) of the web browser 305. If the link opens in a new window, a web browser tab, or an HTML frame (including an iframe) of the web browser 305, the web browser can show the new content in a top-level container of any of those.

Figure 4:
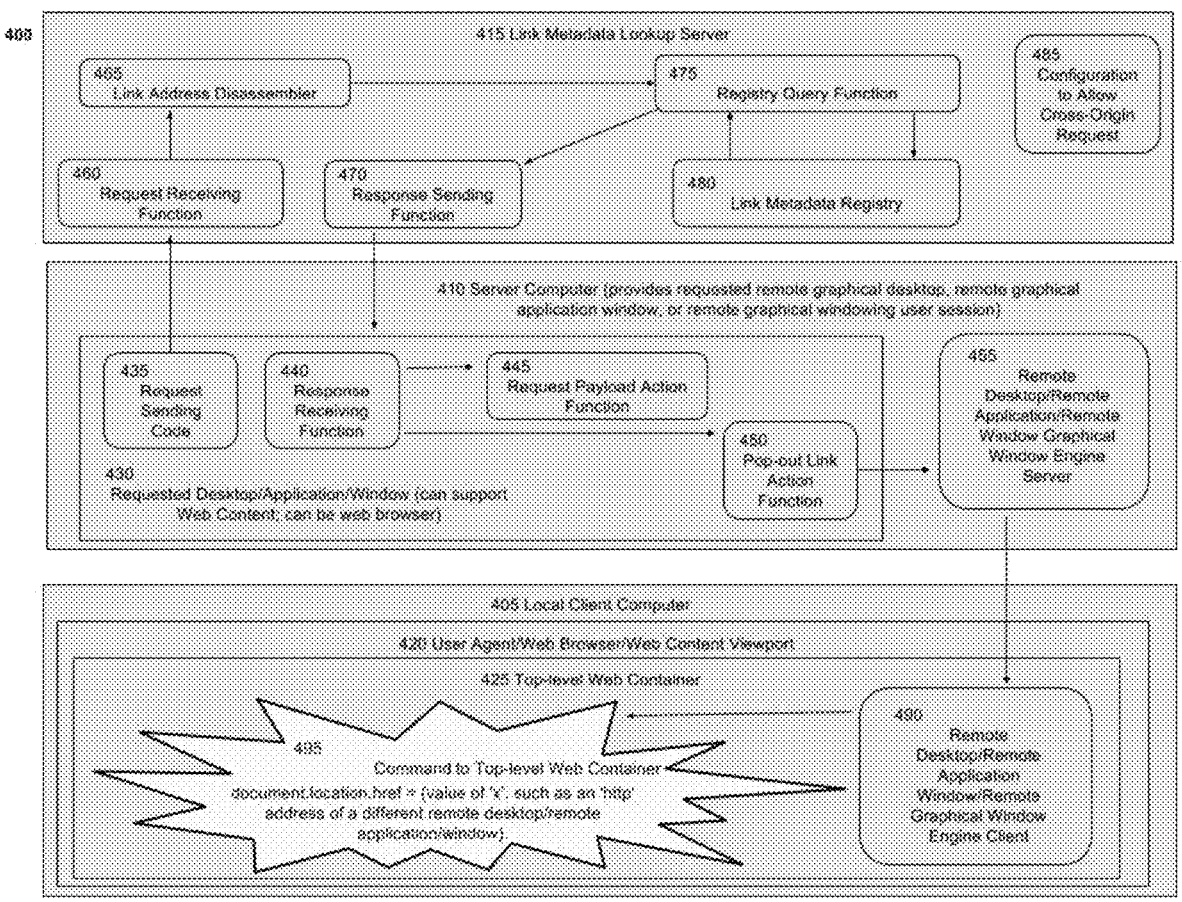
FIG. 4 is a block diagram of a general system embodiment showing how the Link Metadata System and the user agent function to determine if the link is a pop-out link

FIG. 4 is a block diagram 400 showing a general system embodiment where the Link Metadata System ("LMS") 415 on the LMS server apparatus, the Server Computer 410, the Requested Desktop/Application/Window 430 ("Requested Window") and the Remote Desktop/Remote Application Window/Remote Graphical Window Engine Client ("Remoting Engine Client") 490 (such as code running inside a web browser), are configured to determine metadata about a link, and, if the link is a pop-out link, are configured to refresh the top-level container of the User Agent/Web Browser/Web Content Viewport 420. In order to effect this lookup, upon navigational action initiated by the user, the Requested Window 430 would send a query to the lookup service. This would typically be done over the Internet, using HTTP, as an HTTP 'get' request from Request Sending Code 435 to Request Receiving Function 460. While various tooling exists to make this more convenient, the underlying operation can be done as shown in the following JavaScript software code for:

```
Request Sending Code 435
   var req = new XMLHttpRequest( );
   req.addEventListener( "load", requestListener );
   req.open( "GET", "https://www.someServiceUrl.com/lms?uri=" +
   encodeURIComponent( "http://example.com/foo/bar?foo&bar=bat" ));
   req. send( );
```

In the Request Sending Code 435, the code 'encodeURIComponent' (known to those skilled in the art) is given the link metadata query as its argument. This ensures that any parameters inside the link metadata query (the link address, and any associated sub-components) that is passed to the LMS are not seen by the LMS as parameters to the LMS outside of the link metadata query or as part of different parameters. Also notably, the resource at the "www.someServiceUrl.com" link address should be configured with Cross-Origin Resource Sharing Configuration to Allow Cross-Origin Requests 485 ("Configuration") in order for the XmlHttpRequest above to work, unless the request is done to a LMS embodiment that does not require the same (such as the embodiment described above where the LMS is integrated with the DNS) where the XmlHttp request functionality or its equivalent will accept such usage for the LMS endpoint.

The LMS is configured with the capability of looking up the fully-qualified link address sent to it, as in the above example, and returning any stored information regarding that link address. The code for Response Receiving Function 440 from the LMS can be done as shown in the following JavaScript software code for:

```
Response Receiving Function 440
   function requestListener ( ) {
      var linkMetadata = JSON.parse( this.responseText );
   }
```

In the Response Receiving Function 460, once the link metadata object is received, any metadata values that are needed can be accessed.

To receive the query, first the Link Metadata System 415 utilizes a Request Receiving Function 460, similar to Response Receiving Function 440. While the implementation could be done via various frameworks ("tooling") and computer languages, here a JavaScript implementation is described. Similarly to how Request Sending Code 435 uses 'encodeURIComponent', Request Receiving Function 460 uses the built-in JavaScript function 'decodeURIComponent' to turn the link in question into plain text, along with any other specific queries, such as one for 'Content-Type'. Many server toolsets may do this automatically. Then, in the preferred embodiment where the query term isolation is done on the server, Request Receiving Function 460 sends the plain text onward to the Link Address Disassembler 465, which splits the link address into its constituent parts as described above. In the embodiment where the query term isolation is done on the client, these parts are already available, since the Link Disassembler 465 already operated, running on the client of the LMS, which in this example is Server Computer 410. Next, the link address Disassembler 465 sends these parts onward to the Registry Query Function 475.

The Registry Query Function 475 first performs a hash table-based lookup upon the Link Metadata Registry 480 using the top-level domain name item of the link constituent parts. This provides the greatest reduction in lookup scope, making subsequent hash-table (or other) lookups faster because their search space is accordingly smaller. Next it looks up the port segment, if any. If there is no port specified in the lookup table, the lookup can proceed, instead of returning an empty response, in order to allow metadata authors an implicit way to provide metadata for all ports. Next it looks up the first path segment, if any, and then the next, and so on until no further path segment exists or is found. Next, it looks up the scheme (such as 'http' or 'https'), applying the same matching requirement as it does with the port number, so that in the case where no matching entries for scheme are provided, that lookup step is ignored, allowing any scheme to (effectively) "match". Finally, the Registry Query Function 475 returns the value of the final match, which in this implementation is a JSON object that serves as the data payload of the response.

This value is returned to the Response Sending Function 470, which can be implemented similarly to Request Sending Code 435 as a means for sending the looked-up link metadata to the client. The standard security mechanism that is applied in server software to outbound responses provides a "pass" to the outgoing response, because the server has been configured properly according to the Cross-Origin Request rules by the Configuration 485. Therefore, the Response Sending Function 470 sends the response to the Response Receiving Function 440 of Server Computer 410.

The Response Receiving Function 440 checks if the JSON data payload of the response marks the link in question as a pop-out link. If it finds the link is question to be a pop-out link, the Response Receiving Function 440 executes the Pop-out Link Action Function 450. The Pop-out Link Action Function signals the Remote Desktop/Remote Application/Remote Window Graphical Window Engine Server 455 ("Remoting Engine Server") that the Remoting Engine Client's top-level container needs to be refreshed with a URL or URI pointing to the resource requested by the initial navigation action by the user. The Remoting Engine Server 455 relays that signal to Remoting Engine Client 490. Remoting Engine Client 490 issues Command to Top-level Web Container 495 to refresh its content, where 'x' is the link in question and 'document' is the current browsing context (web browser window, tab, or frame or, if specified in the data payload, a child window). This command reloads the top level container of the remote client web browser's targeted current browsing context with the content provided at the link's destination URL or URI.

The preceding description contains embodiments of the invention and no limitation of the scope is thereby intended.

That which is claimed is:

1. A computer-implemented method comprising:
   providing a server computing device configured to run a Remoting Engine Server hosting a remote graphical computer desktop, remote graphical application window, or remote graphical windowing user session;
   providing a client computing device configured to run a Remoting Engine Client that runs on a web browser to request and render content at a given URI;
   establishing a remote graphical computer desktop, remote graphical application window, or remote graphical windowing user session between the Remoting Engine Client and the Remoting Engine Server wherein the established remote graphical computer desktop, remote graphical application window, or remote graphical windowing user session is displayed to a user within a top level container of the Remoting Engine Client running on the web browser;
   receiving, by the Remoting Engine Server, any navigational action, by the Remoting Engine Client that is browsing the established remote graphical computer desktop, remote graphical application window, or remote graphical windowing user session, on any link;
   in response to the navigational action, creating, by the Remoting Engine Server, a query for information as a standard http request, wherein the query includes a URI of the link;
   sending, by the Remote Engine Server, the query for information to a Lookup Server;
   extracting, on the Lookup Server, values from the URI in the query, corresponding to domain and any other URI components;
   looking up information in a Lookup Server registry using the extracted domain and the any extracted URI components;
   receiving, by the Remoting Engine Server, from the Lookup server, a response with a payload of data representing requested information, indicating that the link is a pop-out link;
   sending, by the Remoting Engine Server, a directive to the Remoting Engine Client running on a web browser to reload the Remoting Engine Client's top level container with content provided at the pop-out link's destination URI.

2. The method of claim 1, wherein the user of the client web browser is a human user.

3. The method of claim 1, wherein the user of the client web browser is a search engine web crawler.

4. The method of claim 1, wherein the Lookup Server resides on the same physical or virtual computer as a DNS server.

5. The method of claim 1, wherein the Lookup Server is integrated programmatically into a DNS server, or vice-versa.

6. The method of claim 1, wherein the client web browser is directed to load a whole web page context into a child of itself, new or preexisting, leaving a client parent container unaltered by the navigation action.

7. The method of claim 6, wherein the child of the parent container is an HTML frame.

8. The method of claim 6, wherein the child of the parent container is a browser window or tab.

9. The method of claim 1, wherein the query includes a specifier for a type of information that is being requested.

10. The method of claim 1, wherein looking up information in the Lookup Server registry uses a series of successive, search-scope reducing lookups.

11. The method of claim 10, wherein the series of lookups uses the top-level domain for a first lookup and then uses any URI components in order from most-general to most specific for each successive, search-scope-reducing lookup.

* * * * *